Figure 1:
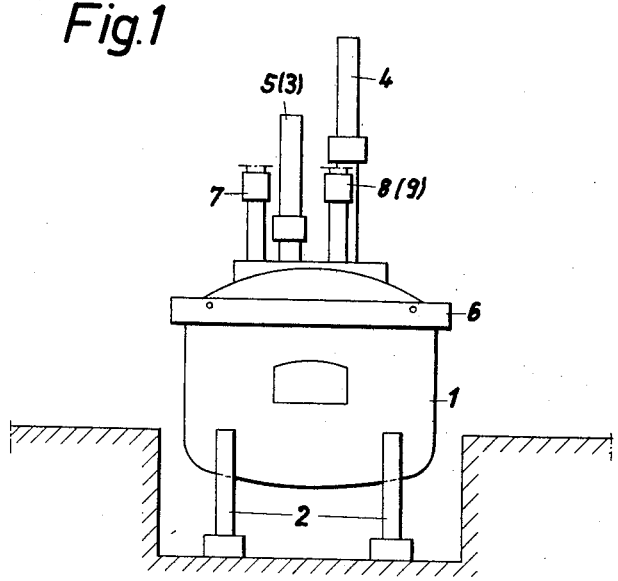

March 1, 1966  F. J. HOFMANN  3,237,930
MELTING FURNACE
Original Filed Sept. 19, 1960  2 Sheets-Sheet 1

Inventor:
FRITZ JUSTUS HOFMANN
BY Spencer & Kaye
ATTORNEYS

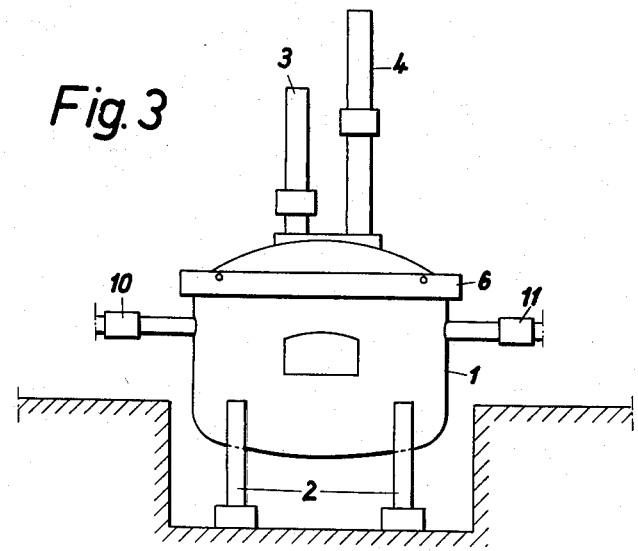
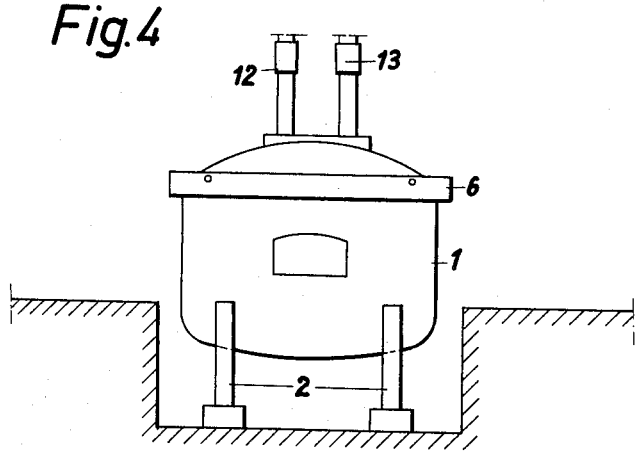

United States Patent Office 3,237,930
Patented Mar. 1, 1966

3,237,930
MELTING FURNACE
Fritz Justus Hofmann, Essen-Bredeney, Germany, assignor to Beteiligungs- und Patentverwaltungsgesellschaft mit Beschrankter Haftung, Essen, Germany
Continuation of application Ser. No. 56,735, Sept. 19, 1960. This application Nov. 6, 1964, Ser. No. 409,504
Claims priority, application Germany, Oct. 1, 1959, B 55,013
2 Claims. (Cl. 266—33)

This application is a continuation of co-pending application Serial No. 56,735, filed September 19, 1960, now abandoned.

When metals, for instance steels, are melted in an electric arc melting furnace the highest power consumption occurs during the first melting down period while the charge is still solid. The power consumption decreases considerably during the subsequent refining period. The electrical equipment, however, has to be designed and dimensioned in such a manner that the high power requirements of the melting down period are met while the electrical equipment is utilized only to a limited extent during the refining period. The load drawn from the electric supply system is therefore fluctuating which is highly undesirable.

It is a primary object of the present invention to avoid these high power consumption peaks which have heretofore been experienced by providing in an arc melting furnace in addition to the electric means for heating the charge by an electric arc discharge further heating means, for instance burners such as oil-oxygen burners of conventional design. It is thus possible to heat the solid charge during the melting down period by said burners while the heating during the refining period may be effected by the electric arc discharge.

It is a further object of the present invention to provide a more economic operation of a melting furnace at considerably reduced installation costs for the electrical equipment, for instance the transformer of a melting furnace, by making the transformer of such dimensions that it is not suited for melting down the cold charge within the customary time. This, of course, is but another way of saying that the transformer is dimensioned only for the power consumption required by the electrodes during the refining period, in which less electric power is required than would be the case if the electrodes were supplied with electric energy for melting down the solid charge during the initial melting down period.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 2:
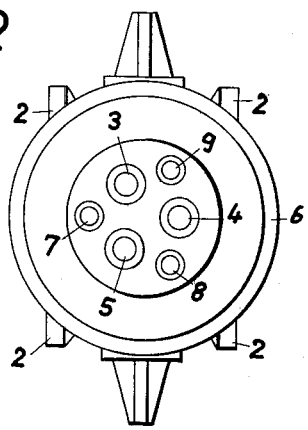

In the drawings:
FIGURE 1 is a side elevation of a melting furnace according to the invention,
FIGURE 2 is a plan view of the melting furnace,
FIGURE 3 is a side elevation of another embodiment of the present invention and
FIGURE 4 is a side elevation of still another embodiment of the present invention.

Referring in more detail to the drawings, FIGURE 1 shows a furnace body 1 open at the top and mounted on rocking cradles 2 in a manner known per se. Electrodes 3-5 are mounted in and passed through a cover 6 seated on the open top of the furnace body 1. There are also mounted in and passed through the cover 6 three burners 7-9. These burners are those of conventional design, e.g. oil-oxygen burners. These burners will be put into operation during the melting down period of the solid charge while the electrodes 3-5 will be lowered (by conventional means not shown) during the refining period and thus heat the charge by an electric arc discharge.

Referring to FIGURE 3 is also possible to mount burners 10 and 11 in and pass these through the side walls of the furnace body 1. The mode of operation will be the same as described for the embodiment of FIG. 1.

Finally, referring to FIGURE 4, the burners 12 and 13 may be passed (by conventional means not shown) through apertures in the cover 6 of the furnace vessel 1, which is mounted on rocking cradles 2 in a manner known per se. These apertures can be so dimensioned that on retracting the burners electrodes may be passed through the same apertures and lowered into the furnace body by conventional means not shown. It is thus possible to convert an existing melting furnace into a melting furnace according to the invention.

In order to reach the high temperatures necessary for the melting down of the solid charge no common air but industrially pure oxygen or oxygen enriched air should be supplied to the burners for the combustion of the fuel which may be oil or a gas. In this manner nitrogen will only be introduced to a limited extent into the charge.

Any sulfur which may be introduced into the charge by the fuel can be eliminated during the refining period, during which period the furnace is heated electrically. It is thus possible to use low-grade fuels with a comparatively high sulfur content without impairing the low sulfur content of steels common for those melted in an electric arc furnace.

I claim:
1. An electric arc melting and refining furnace comprising, in combination:
    (a) a melting vessel which has seated at its top a cover having apertures;
    (b) fuel burner means for melting solid metal charges;
    (c) electrode means operable independently of said fuel burner means for heating the liquid metal during the refining operation;
    (d) said fuel burner means and said electrode means being alternatively introduceable into the interior of said vessel through the same apertures; and
    (e) electric power supply means for said electrode means, said power supply means incorporating a transformer which is of such dimensions that it is unsuited for melting down the cold charge within the customary time but is suited for the power consumption required by the electrode means during the refining period.
2. A furnace as defined in claim 1, further comprising means for supplying industrially pure oxygen to said fuel burner means.

References Cited by the Examiner
UNITED STATES PATENTS

| | | | |
|---|---|---|---|
| 1,440,106 | 12/1922 | Rothert | 13—2 |
| 1,587,197 | 6/1926 | Southgate | 13—2 |
| 1,904,683 | 4/1933 | Greene | 13—2 |
| 2,927,142 | 3/1960 | La Bate | 13—2 |

JOHN F. CAMPBELL, *Primary Examiner.*